United States Patent [19]

Blanks

[11] Patent Number: 5,315,465
[45] Date of Patent: May 24, 1994

[54] COMPLIANT PIVOT MECHANISM FOR A ROTARY ACTUATOR

[75] Inventor: John B. Blanks, Edmond, Okla.

[73] Assignee: Seagate Technology, Inc., Scotts Valley, Calif.

[21] Appl. No.: 729,453

[22] Filed: Jul. 12, 1991

[51] Int. Cl.⁵ .............................................. G11B 5/55
[52] U.S. Cl. .................... 360/106; 360/105; 360/109; 360/128
[58] Field of Search ........ 360/106, 104–105, 360/109, 77.03, 128, 130.3

[56] References Cited

U.S. PATENT DOCUMENTS

| | | | |
|---|---|---|---|
| 3,269,204 | 8/1966 | Schleicher, Jr. | 74/424.5 |
| 3,626,743 | 11/1971 | Koch | 72/330 |
| 3,633,398 | 1/1972 | Koch | 72/131 |
| 3,700,271 | 10/1972 | Blaurock et al. | 287/52.04 |
| 3,776,653 | 12/1973 | Buzogany | 403/372 |
| 3,838,928 | 10/1974 | Blaurock et al. | 403/372 |
| 4,286,894 | 9/1981 | Rongley | 403/372 |
| 4,790,683 | 12/1988 | Cramer, Jr. et al. | 403/372 |
| 4,828,423 | 5/1989 | Cramer, Jr. et al. | 403/372 |
| 4,888,656 | 12/1989 | West | 360/106 |
| 4,893,206 | 1/1990 | Shtipelman et al. | 360/106 |
| 4,896,239 | 1/1990 | Ghose | 360/106 |
| 4,984,115 | 1/1991 | Takahashi et al. | 360/106 |
| 4,995,025 | 2/1991 | Schulze | 360/106 |

FOREIGN PATENT DOCUMENTS 01-57463 3/1989 Japan .

Primary Examiner—Constantine Hannaher
Assistant Examiner—Kim-Kwok Chu
Attorney, Agent, or Firm—Edward P. Heller, III; Bill D. McCarthy; Louis W. Watson

[57] ABSTRACT

A pivot mechanism for a rotary actuator in a disc drive data storage device comprising a pivot shaft having a shoulder near one end thereof, the pivot shaft disposed in a central bore of an actuator body having a medially disposed narrow section spatially separating upper and lower bearing assemblies supported on the pivot shaft. Tolerance rings are disposed between the bearing assemblies and the actuator body, and a preloading resilient member biases the bearing assemblies to abut against the narrow section and the shoulder on the pivot shaft. Preferably, adhesive bonds the upper bearing assembly to the pivot shaft once preloading is achieved.

8 Claims, 3 Drawing Sheets

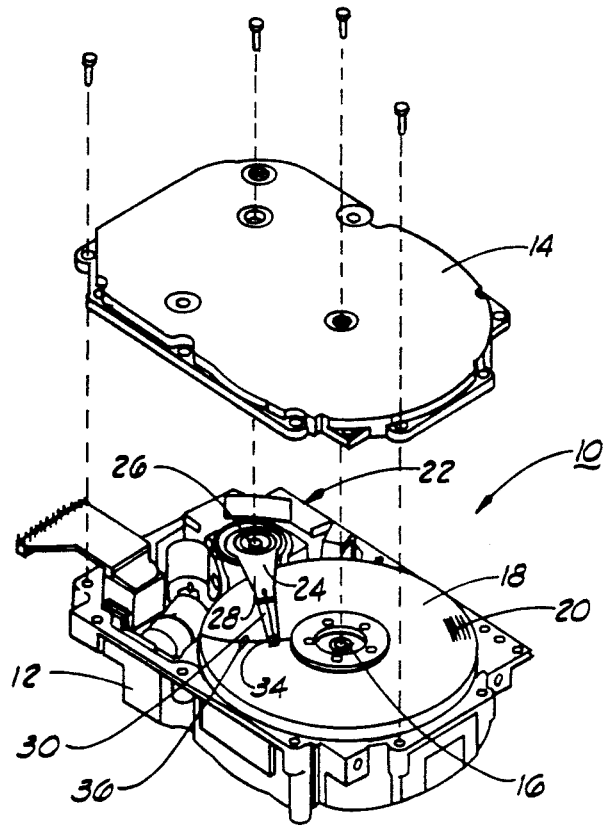
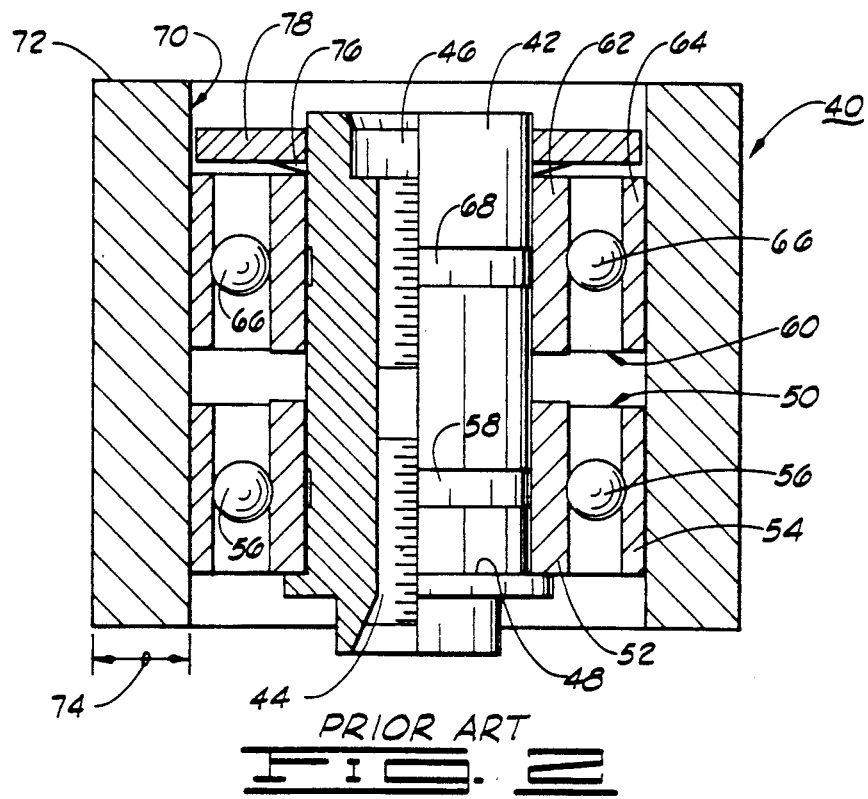
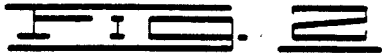

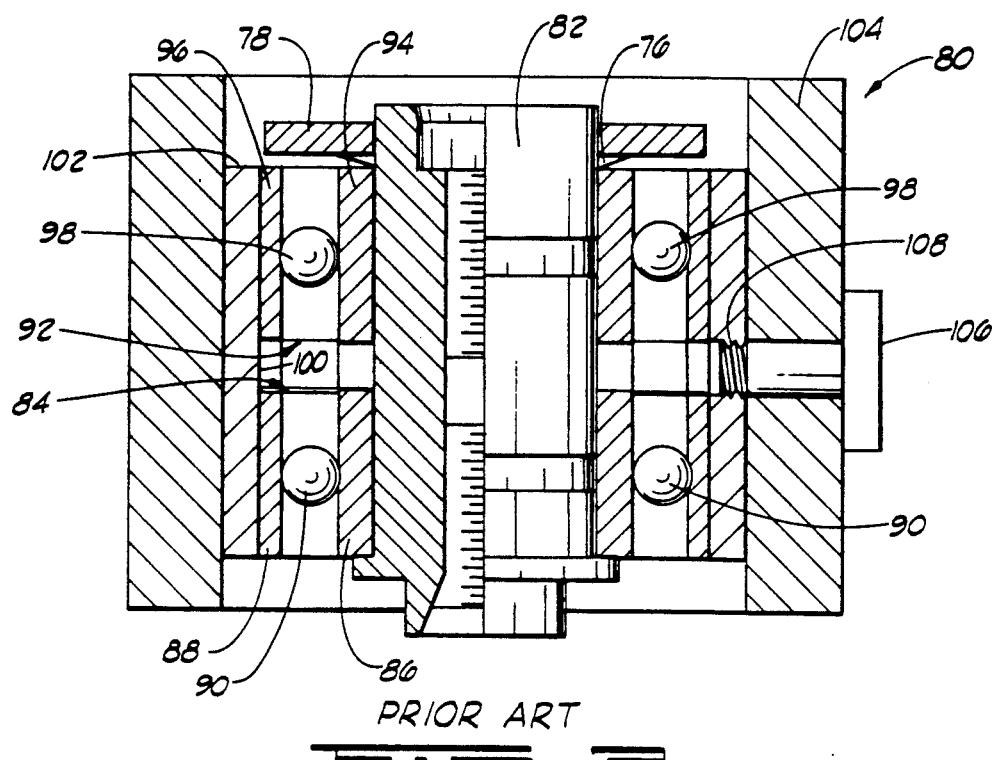
PRIOR ART
FIG. 3
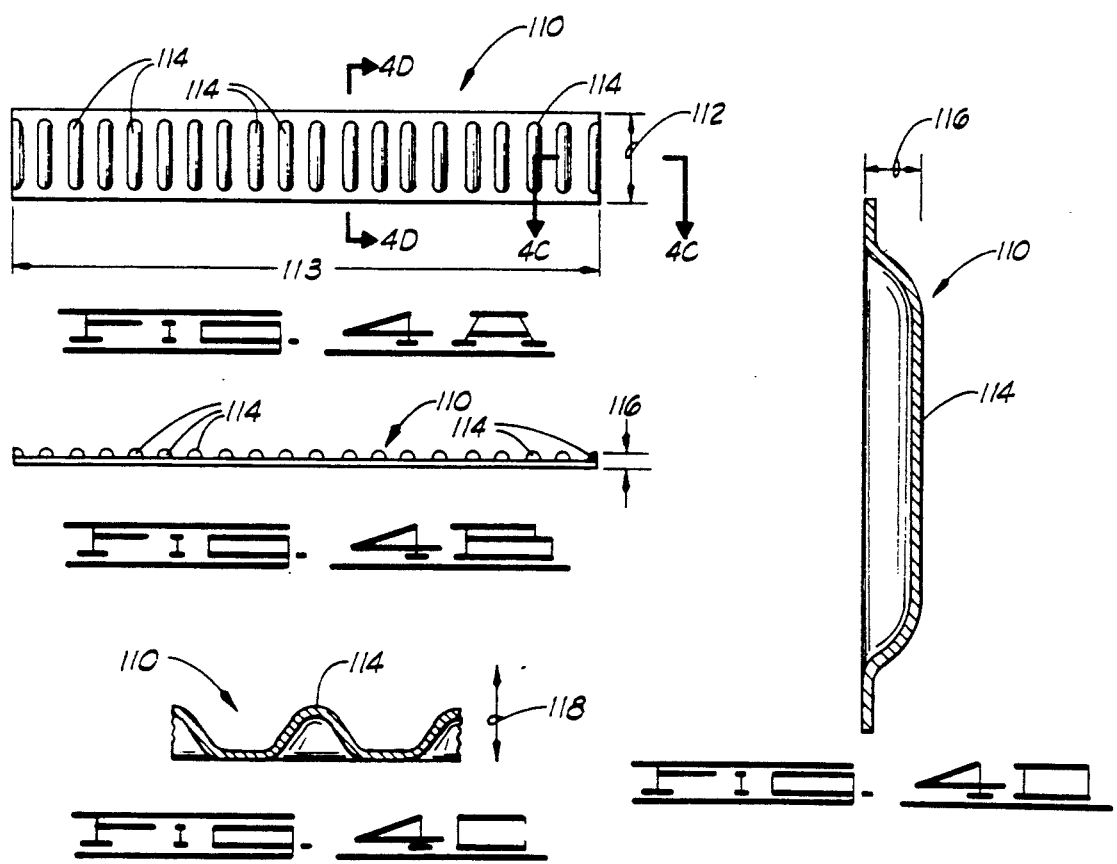
FIG. 4A
FIG. 4B
FIG. 4C
FIG. 4D

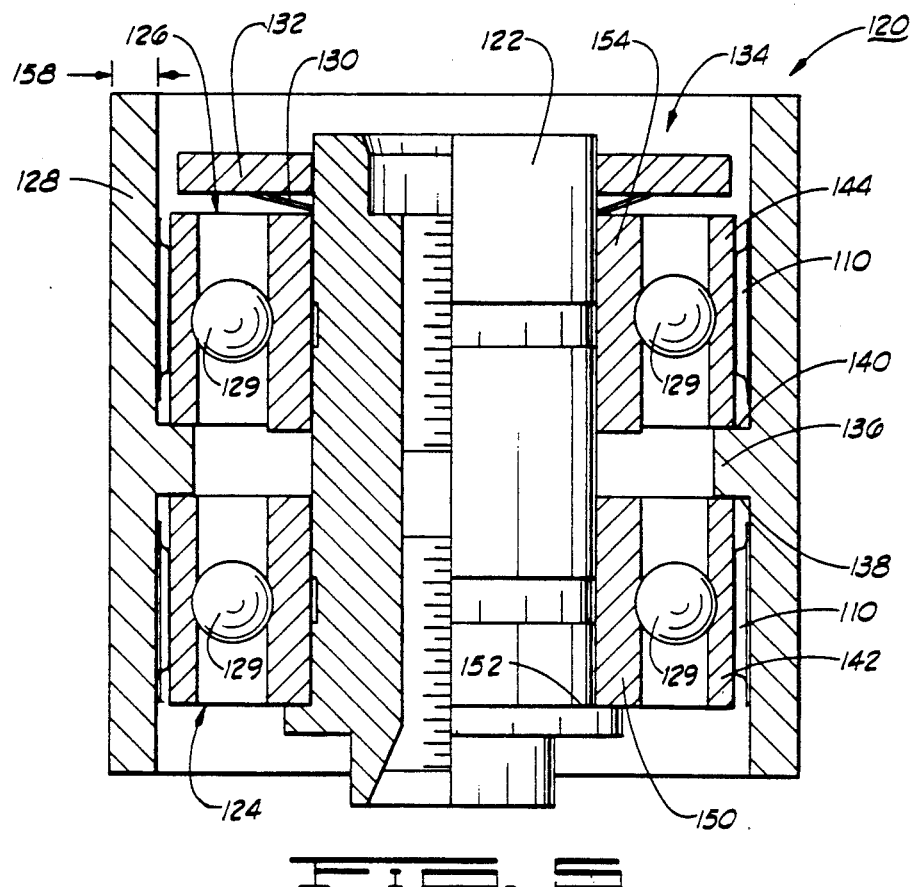
FIG. 5
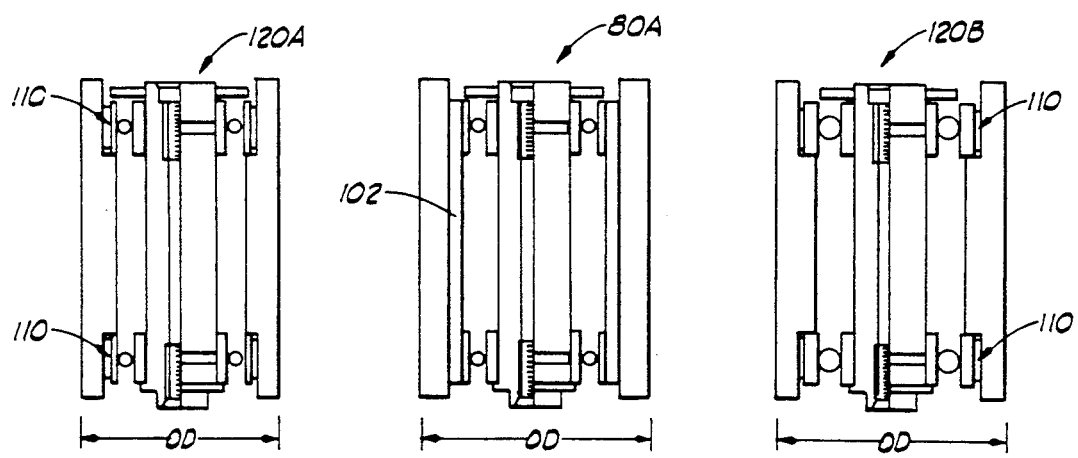
FIG. 5A   PRIOR ART   FIG. 5C
FIG. 5B

COMPLIANT PIVOT MECHANISM FOR A ROTARY ACTUATOR

BACKGROUND OF THE INVENTION

1. Field of the Invention

This invention relates generally to the field of disc drive data storage devices and more particularly, but not by way of limitation, to an improved pivot bearing structure for use in a rotary actuator in a disc drive data storage device.

2. Brief Description of the Prior Art

Disc drives of the type referred to as "Winchester" disc drives are well known in the industry. Such disc drives incorporate a "stack" of one or more disc-shaped platters mounted on a spindle motor for constant high speed rotation. The surface of each of these discs is coated with a magnetizable medium for recording digital data in a plurality of circular, concentric data tracks.

A number of read/write heads act in cooperation with the disc surfaces for the recording and retrieval of data. These heads are attached to some sort of actuator mechanism which operates under the control of electronic circuitry to controllably move the heads from track to track In the archetype "Winchester" disc drive, these heads rest in contact with the surface of the discs prior to the application of power to the drive. As the spindle motor receives power and begins to spin, the discs drag a thin layer of air along with them. As the discs accelerate toward their specified operating speed, this thin layer of air interacts with ski-like structures on the surface of the read/write heads and the heads begin to "fly" above the disc surface. The height at which the heads "fly" above the disc surface, or "flying height", is dependent upon the geometry of the head, the head support means and the linear velocity of the disc under the head, along with other factors.

The actuator that moves the read/write heads has taken many different forms over the years. Early Winchester disc drives for personal computers used a stepper motor to move the read/write heads in a straight radial line across the disc surface. This radial movement was guided by an arrangement of parallel rods and ball bearings and is referred to as a "linear stepper actuator". A similar arrangement of guide rods and ball bearings powered by a voice coil motor (VCM) was also frequently used and is called a "linear VCM actuator".

A second type of actuator that has often been used is the rotary actuator. A rotary actuator, as its name implies, includes a pivot mechanism located closely adjacent the outer diameter of the discs, and has an axis of rotation that is parallel to the spin axis of the spindle motor and discs. A number of head support arms extend from the pivot mechanism over the surfaces of the discs and permit the heads to move in an arcuate path from track to track. Again, both stepper motors and VCMs have been used to power the head movement, and actuators using these motors are referred to as "rotary stepper actuators" and "rotary VCM actuators", respectively.

Rotary actuators are generally more compact than linear actuators and have thus found favor in recent disc drive designs for the "three-and-a-half-inch" and "two-and-a-half-inch" form factors. Another advantage of rotary actuators is that they usually have a smaller moving mass than comparable linear actuators, and, as such, provide faster head movement, causing faster data access.

No matter what type of motor is used to power a rotary actuator, the precision of the pivot mechanism is crucial to the proper operation of the disc drive. A typical rotary actuator pivot mechanism includes a pair of ball bearing assemblies situated one above the other with the inner races of the bearings fixed to a stationary shaft and the outer races attached to a structure that includes the driving motor, or attachment thereto, and the head support apparatus. The stationary shaft is commonly fabricated from steel and either screwed or staked into the base casting of the disc drive unit in as precise a relationship to the spindle motor and discs as is permitted by manufacturing technology. The structure that supports the heads and attaches to the actuator motor is typically made from aluminum or magnesium to minimize the moving mass. The bearing assemblies themselves are made of steel. This mixing of materials, steel for strength and wear resistance and aluminum or magnesium for lightness, leads to several of the principal engineering challenges involved in the design of rotary actuators.

The first of these engineering challenges involves the effects of differential thermal expansion. Since steel and aluminum or magnesium have significantly different coefficients of thermal expansion, i.e., they expand and contract at different rates and to different extents for the same temperature change, changes in the geometric relationship of these critical parts can be altered by changes in temperature. Disc drives of the current technology are typically specified to operate over an ambient temperature range of 5°-50° C. (41°-122° F.), and the internal temperature can be expected to rise another 20° C. above ambient. This temperature range is wide enough to cause off-track problems in the disc drive unless carefully considered by the designer.

The second problem caused by the use of differing materials lies in how the various components are attached to each other. This attachment is commonly accomplished by either press-fitting or the use of adhesives. Each of these techniques creates its own set of potential problems which will be discussed in more detail below.

Another consideration in the design of a rotary actuator is the resonant frequency of the assembly. Manufacturers of computer systems specify the amount and type of shock and vibration that the disc drive must be able to endure without suffering damage and without degrading data handling operations. Since the actuator of a disc drive must move the heads at a high rate of speed, a faulty design can result in sympathetic vibrations being induced in the actuator mechanism, inhibiting the ability of the disc drive to accurately read or recover data. In a properly designed actuator, the natural frequency should be high enough to ensure that such sympathetic vibrations do not occur.

Clearly a need exists for an improved pivot mechanism that minimizes the size, and thus the moving mass, of the rotary actuator, while overcoming the traditional problems encountered when creating a pivot mechanism out of differing materials.

SUMMARY OF THE INVENTION

In the present invention, a pivot shaft of steel is conventionally attached to the inner races of a pair of ball bearing assemblies, and mounting of the outer races of the ball bearings to the inner surface of a central bore in the actuator body of an actuator mechanism is achieved by using a pair of specially constructed tolerance rings. A narrow section in the central bore provides axial positioning of the outer races of the bearing assemblies, while the tolerance rings provide radial positioning of the outer races relative to the bore.

The use of tolerance rings to fix the bearings to the actuator body allows a thinner wall on the bore in the actuator body, reducing the size of the completed assembly and lowering the arm inertia as the actuator can be positioned closer to the discs, thus increasing the strength and stability of the pivot mechanism.

A shoulder on the pivot shaft and the narrow section in the central bore of the actuator body serve to define the relative axial positions of the ball bearing assemblies and allows assembly without the use of precise and expensive assembly fixtures.

It is an object of the invention to provide a pivot mechanism for a rotary actuator for a disc drive that allows the reduction of the radial dimension of the moving portion of the actuator.

It is another object of the invention to provide a pivot mechanism for a rotary actuator for a disc drive that reduces the effects of differential thermal expansion associated with an assembly that includes differing materials.

It is another object of the invention to provide a pivot mechanism for a rotary actuator for a disc drive that eliminates the problems associated with attaching components made of differing materials.

It is another object of the invention to provide a pivot mechanism for a rotary actuator for a disc drive that is easily fabricated using existing manufacturing technology and is readily reworked in the manufacturing environment when a defect is found in the completed assembly.

It is yet another object of the invention to provide a method for assembling a pivot mechanism for a rotary actuator for a disc drive that does not require the use of expensive assembly tooling and fixtures.

Other objects, features and advantages of the present invention will become apparent from the following detailed description when read in conjunction with the drawings and appended claims.

A BRIEF DESCRIPTION OF THE DRAWINGS

FIG. 1 is a partially exploded perspective view of a prior art disc drive of the type in which the present invention is particularly useful.

FIG. 2 is a partially sectional elevation view of a typical prior art pivot mechanism.

FIG. 3 is a partially sectional elevation view of another pivot mechanism from the prior art.

FIGS. 4A, 4B, 4C and 4D are plan, elevation, longitudinal sectional and lateral sectional views, respectively, of a tolerance ring component of the present invention.

FIG. 5 is a partially sectional elevation view of a pivot mechanism constructed in accordance with the present invention.

FIGS. 6A, 6B and 6C are diagrammatical representations of three pivot mechanisms, one from the prior art and two embodiments of the present invention, all drawn to the same scale to illustrate the dimensional advantages of the present invention.

DESCRIPTION

Referring to the drawings and specifically to FIG. 1, shown is a typical prior art disc drive 10 in which the present invention is particularly useful. The disc drive 10 includes a base member 12, sometimes referred to as a base casting, to which other mechanical components are mounted and which, together with a top cover 14, forms a sealed housing for preventing contamination of the internal components. A spindle motor 16 is mounted to the base member 12 and supports a plurality of discs 18 for rotation. The surfaces of the discs 18 include a multiplicity of data tracks 20. An actuator motor, shown generally at 22, serves to rotate an actuator body 24 about a pivot shaft 26 under the control of electronic circuitry (not shown). The actuator body 24 includes a number of head mounting arms 28 which in turn mount a number of head supports 30, each mounting a read/write head 34. As the actuator body 24 rotates about the pivot shaft 26, the read/write heads 34 are moved across the discs 18 along an arcuate path 36 to provide access to the data tracks 20. The ability of the disc drive 10 to accurately access the data on the discs 18 depends to a great extent on the parallelism between the axis of rotation of the spindle motor 16 and the axis of rotation of the actuator body 24, and the relative location of the spindle motor 16 and pivot shaft 26. It will be appreciated that minimizing the size of the actuator body 24 will permit it to be disposed nearer the discs 18, thereby producing lower arm inertia and resulting in reduced access time and a higher natural frequency.

Referring now to FIG. 2, shown is a partially sectional elevation view of a pivot mechanism 40 for a rotary actuator, such as shown in FIG. 1, constructed in accordance with technology in the prior art. Included in the pivot mechanism 40 is a pivot shaft 42 made of steel. In the left half of FIG. 2, this pivot shaft 42 is shown in section, while in the right half of FIG. 2 the pivot shaft 42 is shown in elevation. The pivot shaft 42 has screw holes 44, 46 in the bottom and top, respectively. The bottom hole 44 is used to receive a screw (not shown) to mount the pivot mechanism 40 to the base member 12. The top hole 46 is used in a similar manner to secure the top of the pivot shaft 42 to the top cover 14, after the base member 12 and top cover 14 are assembled together.

The technique of securing both the top and bottom of the pivot shaft 42 in a rotary actuator to minimize tilt and wobble is well known in the industry. The pivot shaft 42 is made with a shoulder 48 located near the lower end of the pivot shaft 42 that acts as a stop against which a lower ball bearing assembly 50 rests. This lower ball bearing assembly 50 consists of an lower inner race 52, a lower outer race 54 and a number of balls 56. The lower inner race 52 is either press-fitted or adhesively bonded to the pivot shaft 42. If the lower bearing 50 is adhesively bonded to the pivot shaft 42, an annular groove 58 is usually included in the pivot shaft 42 to carry the bonding adhesive (not shown) around the outer surface of the pivot shaft 42. Since both the pivot shaft 42 and the lower inner race 52 are made of steel, either of these assembly techniques will usually provide an adequate attachment that should not be subject to shifting due to mechanical or thermal stress.

An upper ball bearing assembly 60 is also shown mounted at the upper end of the pivot shaft 42. This upper ball bearing assembly 60 also consists of an upper inner race 62, an upper outer race 64 and a number of balls 66. The inner race 62 of the upper ball bearing assembly 60 is dimensioned to be a slip fit over the pivot shaft 42, and it is then adhesively bonded to the pivot shaft 42, with a second annular groove 68 provided in the pivot shaft 42 to spread the adhesive. The outer races 54, 64 of the ball bearing assemblies 50, 60 are similarly press-fitted or adhesively bonded inside a cylindrical bore 70 in an actuator body 72. This actuator body 72, supported by the ball bearing assemblies 50, 60 on the stationary pivot shaft 42, forms the moving portion of the pivot mechanism 40 and includes features (not shown) for the attachment of the actuator body 72 to the actuator motor 22 and the head mounting arms 28.

As known, the ball bearing assemblies 50, 60 must be preloaded during assembly to establish the proper contact between the balls 56, 66 and the inner and outer races 52, 54, 62, 64. To achieve maximum stiffness, the inner races 52, 62 are usually preloaded toward each other and the outer races 54, 64 are preloaded away from each other. This preloading can be done either by applying a dead weight and appropriately bonding the bearing components or with a spring mechanism, such as a Belleville washer, wave washer, coil spring or other like resilient member. The lower inner race 52 is held in place and the upper inner race 62 is allowed to float on the pivot shaft 42 until the preload is applied. The upper inner race 62 is then fixed in place.

In the configuration shown in FIG. 2, the lower inner race 52 is axially constrained by the shoulder 48 while the actuator body 72 is either press-fitted over the lower outer race 54 or positioned over the lower outer race 54 and then adhesively bonded. Either method requires manufacturing tooling to establish the relative axial position of the lower outer race 54 and the actuator body 72. The upper outer race 64 can then be pressed int the bore 70 of the actuator body 72 to a position determined again by manufacturing tooling, while the upper inner race 62 is allowed to float on the pivot shaft 42. The preload force or bias is then applied to the top of the upper inner race 62 and the upper inner race 62 is adhesively bonded in place. In FIG. 2, the preload force or bias is applied by a spring washer 76 inserted between the top of the upper inner race 62 and a circular ring or clip retaining member 78, or other restriction device fixed on the pivot shaft 42.

The actuator body 72 is typically formed of aluminum or magnesium to minimize the moving mass, and the outer races 54, 64 of the lower and upper ball bearing assemblies 50, 60 are made of steel. The use of different materials can result in differential thermal expansion movement of these components, and depending on the method used to secure the outer races 54, 64 to the actuator body 72, problems are encountered with this configuration.

First, if the ball bearing assemblies 50, 60 are press-fitted within the bore 70 of the actuator body 72, tolerance for the machining of the bore 70 would have to be held within the range of about +0.0001 inch. This kind of close tolerance control increases the cost of the total assembly.

Further, since the two materials expand and contract at different rates over typical specified operating temperature ranges, press-fitting can cause distortion of the relative dimensions of the components, resulting in tracking errors in the disc drive. To counteract this tendency, the wall thickness 74 of the aluminum or magnesium actuator body 72 in the region of the central bore 70 is typically three or more times as thick as the thickness of the steel bearing outer races 54, 64. This practice, however, increases the overall diameter of the complete pivot mechanism 40, which may not be acceptable in designs for current small form factor disc drives.

Second, if the differing materials are adhesively bonded together, difficulties arise in centering the ball bearing assemblies 50, 60 within the bore 70 in the actuator body 72 and evenly distributing the bonding agent radially about the outer races 54, 64 of the ball bearing assemblies 50, 60. Failure to achieve accurate alignment of these parts can result in errors in the desired geometric relationship between the rotary actuator and the spindle motor as noted above in the discussion of FIG. 1.

Another problem with adhesively bonding the ball bearing assemblies 50, 60 within the bore 70 of the actuator body 72 relates again to differential thermal expansion and contraction. When these components expand or contract at different rates, the stresses imposed act primarily on the bonding agent, which can lead to failure of the adhesive bond over time. Furthermore, adhesive bonding of the components creates the risk that some of the bonding agent may leak or migrate onto the operational surfaces of the ball bearing assemblies 50, 60, rendering the entire pivot mechanism 40 unusable.

Yet another reason for eliminating adhesive bonding arises if the completed pivot assembly does not function properly after assembly. Such a malfunction could be the result of improperly fabricated components, damaged components or, as noted above, adhesive leaking into the interior of the ball bearing assemblies. If the outer races 54, 64 of the bali bearing assemblies 50, 60 are adhesively bonded to the inner bore 70 on the actuator body 72, it is extremely difficult to separate these parts without damaging the relatively soft actuator body 72 which is by far the most expensive component in the pivot mechanism 40, resulting in excessive scrap costs.

FIG. 3 depicts another prior art pivot mechanism 80, substantially identical in construction to to pivot mechanism 40 shown in FIG. 2. Like the pivot mechanism 40, the pivot mechanism 80 includes a pivot shaft 82; a lower ball bearing assembly 84, having a lower inner race 86, a lower outer race 88 and a number of balls 90; and an upper ball bearing assembly 92, having an upper inner race 94, an upper outer race 96 and a number of balls 98. The method employed to mount the inner races 86, 94 to the pivot shaft 82, and to preload the inner races 86, 94, is the same as the method described in the discussion of FIG. 2, and will not be repeated here.

The pivot mechanism 40 and the pivot mechanism 80 differ in that the outer races 88, 96 of the ball bearing assemblies 84, 92 of FIG. 3 are press-fitted or adhesively bonded to inner surface 100 of a cylindrical steel sleeve 102, forming a subassembly. This sub-assembly is sometimes referred to as a "bearing cartridge", and includes the pivot shaft 82, the ball bearing assemblies 84, 92 and the steel sleeve 102. Since all components of this bearing cartridge sub-assembly are made of steel, none of the problems associated with bonding or press-fitting components of differing materials, as noted above in the discussion of FIG. 2, are encountered in this sub-assembly. Rather, it is only when the bearing cartridge sub-assembly is to be attached to an aluminum or magnesium actuator body 104 that the same problems occur as noted previously. That is, differing thermal expansion and contraction rates between the steel bearing cartridge components and the aluminum or magnesium actuator body 104 can lead to geometric distortion, if press-fitting is employed; component misalignment; or bond failure, if the parts are adhesively bonded.

Once again, this type of assembly requires that expensive assembly tooling be employed to accurately locate the bearing cartridge sub-assembly axially within the actuator body 104.

Further, the addition of the steel sleeve 102 increases the diameter of the entire pivot mechanism 80, potentially rendering it unsuitable in the compact disc drives of current technology, and increases the cost of the bearing assembly by as much as 50%. It also increases the moving mass.

FIG. 3 also illustrates an alternative prior art method of securing the bearing cartridge sub-assembly to the actuator body 104. In this approach, a screw 106 is inserted through a hole in the actuator body 104 and into a threaded hole 108 in the steel sleeve 102. This method alleviates some of the differential thermal expansion and contraction problems noted above, but adds additional machining costs, manufacturing steps and moving mass to the design.

Prior to describing the pivot mechanism of the present invention (shown in FIG. 5), attention will first be directed to FIGS. 4A through 4D, which are several views of a tolerance ring 110 forming a part of the present invention. The tolerance ring strip 110 is formed from steel strip material which is shaped into a ring upon assembly into the pivot mechanism of the present invention. Typical material thickness is about 0.005 inch. The width 112 of the tolerance ring 110 is approximately the same as the width of the outer race of the bearings shown in FIG. 5, and the length 113 of the tolerance ring 110 is slightly shorter than the outer circumference of the ball bearing assembly of FIG. 5. As shown in these figures, parallel raised contact surfaces 114 are formed to a height 116 of typically about 0.013 inch in the tolerance ring 110. The shape of the raised contact surfaces 114 and the thinness of the material make the contact surfaces 114 relatively compliant in the axis defined by arrow 118 in FIG. 4C. The significance of this compliance will become evident in the following discussion. The tolerance ring 110 is available commercially from USA Tolerance Ring Corporation of West Trenton, N.J.; a typical model of such is ANL 12.7X5S.

FIG. 5 shows a pivot mechanism 120 made in accordance with the present invention. The pivot mechanism 120 is similar in construction to the pivot mechanisms discussed above except as described hereinafter, and includes a pivot shaft 122, a lower ball bearing assembly 124, an upper ball bearing assembly 126 and an actuator body 128, with each of the ball bearing assemblies 124, 126 including a plurality of balls 129. Preloading of the ball bearing assemblies 124, 126 is accomplished using a spring washer 130 and a fixed ring or clip 132 as previously explained. The actuator body 128 includes a central bore 134 having upper and lower portions of a slightly larger diameter, and a narrow section 136 of reduced diameter at approximately the midpoint of the central bore 134.

A lower surface 138 and an upper surface 140 of this narrow section 136 provide contact surfaces for lower outer race 142 and upper outer race 144 of the ball bearing assemblies 124, 126, respectively. The contact between lower inner race 150 and shoulder 152 of the pivot shaft 122, and between the outer races 142, 144 of the ball bearing assemblies 124, 126 and the lower surface 138 and the upper surface 140 of the narrow section 136, combined with the preload applied to the upper inner race 154, fixedly establishes the axial relationship between the pivot shaft 122 and the actuator body 128 without the need for any assembly fixture or gauges. A pair of tolerance rings 110, described in the discussion of FIGS. 4A–4D above, are provided and are located between the outer surfaces of the outer races 142, 144 and the inner surface of the central bore 134 in the actuator body 128.

Assembly of the pivot mechanism 120 preferably is accomplished in the following order:

1.1. The lower ball bearing assembly 124 is placed over the pivot shaft 122 and brought to rest with the inner race 150 against the shoulder 152 provided thereon. This can be a press-fit operation, or the inner race 150 may be adhesively bonded to the pivot shaft 122.

1.2. The first and second tolerance rings 110, are assembled into the lower portion and the upper portion of the central bore 134, respectively, of the actuator body 128. This is achieved by simply bending the tolerance rings 110 from their strip form into rings and inserting them into the central bore 134, as depicted in FIG. 5. The elasticity of the tolerance ring material will hold the tolerance rings 110 in these positions while the succeeding steps are accomplished.

1.3. The actuator body 128 with the tolerance rings 110 installed is pressed down over the lower bearing assembly 124 until the top surface of the lower outer race 142 of the lower bearing assembly 124 is in contact with the lower surface 138 of the narrow section 136 in the central bore 134 of the actuator body 128. This operation slightly compresses the first tolerance ring 110 between the lower outer race 142 and the inner surface of the central bore 134 of the actuator body 128; establishes the radial position of the lower ball bearing assembly 124 and pivot shaft 122 within the actuator body 128; and further establishes the relative axial position between the pivot shaft 122 and the actuator body 128.

1.4. Adhesive is applied to the inner surface of the inner race 154, and the upper bal bearing assembly 126 is pressed into the upper secondary bore of the actuator body 128 until the lower surface of the upper outer race 144 contacts the upper surface 140 of the narrow section 136 in the central bore 134 of the actuator body 128, compressing the second tolerance ring 110 between the upper outer race 144 and the inner surface of the central bore 134 in the actuator body 128. At this time, the adhesive applied to the upper inner race 154 has not set up; thus the upper inner race 154 is a slip fit on the pivot shaft 122.

1.5. The spring washer 130 is installed over the pivot shaft 122 and the ring or clip 132 is fixed to the pivot shaft 122, compressing the spring washer 130 and establishing the preload of the bearing assemblies 124, 126.

1.6. The adhesive applied to the upper inner race 154, once set up, adhesively bonds the upper inner race 154 to the pivot shaft 122.

It will be apparent that testing of the assembled unit may be done after step 1.6 above. If such testing reveals the failure of any of the components or the assembly process, the actuator body 128, by far the most expensive component in the assembly, can be readily separated and reused, thus greatly reducing the value of scrapped parts and lowering the average cost of the entire disc drive unit.

Furthermore, since the axial position of the ball bearing assemblies 124, 126 is established by bringing the bearing races into contact with the shoulder 152 on the pivot shaft 122 and upper and lower surfaces 138, 140 of the narrow section 136 in the central bore 134 of the actuator body 128, no gauges or expensive assembly fixture are needed to ensure proper interrelationship of the components. Instead, the only variability from unit to unit will be the result of more easily controlled component tolerances, thus ensuring a more uniform final assembly.

It will be noted that the tolerance rings 110 are installed in the central bore 134 of the actuator body 128 with the raised contact surfaces 114 toward the outer races 142, 144 of the bearing assemblies 124, 126. This orientation distributes the force generated by pressing the bearing assemblies 124, 126 into the actuator body 128 across a relatively large area on the actuator body 128 and a relatively small area on the outer races 142, 144 of the bearing assemblies 124, 126. Since the outer races 142, 144 and the tolerance rings 110 are steel, and the actuator body 128 is preferably aluminum or magnesium, this minimizes the risk of damaging the relatively soft central bore 134 of the actuator body 128.

It should also be noted in FIG. 5 that the thickness of the wall of the actuator body 128, designated as 158 therein, is relatively thinner than that shown in the prior art examples of FIGS. 2 and 3 above. In the present invention, the stresses imposed by differential thermal expansion and contraction will be compensated for and absorbed by the compliance of the tolerance rings 110 noted above in the discussion of FIGS. 4A-4D. This in turn allows the outer diameter of the actuator body 128 to be reduced, resulting in a more compact rotary actuator assembly with the same size ball bearing assemblies.

One significant advantage of the present invention is best shown diagrammatically in FIGS. 6A-6C, wherein three pivot mechanisms are drawn to the same scale. FIG. 6B illustrates a prior art pivot mechanism 80A similar to that discussed in relation to FIG. 3 above, i.e., a pivot mechanism including a bearing cartridge subassembly. FIGS. 6A and 6C show alternative embodiments 120A and 120B, respectively, of the pivot mechanism of the present invention. A comparison of FIG. 6B to FIG. 6A shows that both pivot mechanisms 80A and 120A use ball bearing assemblies of the same size, but that the pivot mechanism 120A of FIG. 6A has a significantly smaller outer diameter (OD) due to the implementation of the present invention, making the pivot mechanism 120A suitable for use in disc drives of smaller form factors.

Comparing the pivot mechanism 80A of FIG. 6B to the pivot mechanism 120B of FIG. 6C shows that both of these pivot mechanisms have the same overall outer diameter, but the use of the present invention in FIG. 6C allows the inclusion of a significantly larger ball bearing assembly. This larger ball bearing assembly results in a much stiffer pivot mechanism within the same physical package. The advantage of a stiffer pivot mechanism lies in its much higher natural frequency, adding to the precision of the entire disc drive.

Furthermore, the compliance of the tolerance rings 110 allows for the loosening of the machining tolerance on the central bore 134 of the actuator body 128. The diameter of the central bore 134 in the pivot mechanism 120 of the present invention need only be held within about +0.001 inch tolerance instead of a much tighter +0.0001 inch tolerance, thus reducing the cost of the pivot mechanism and the entire disc drive.

Tests have proven the accuracy of the pivot mechanism 120 of the present invention over normally specified temperature ranges to be superior to press-fitted pivot mechanisms, and the long term reliability of the present invention is better than other adhesively bonded assemblies.

The radial stiffness of the tolerance rings 110 is great enough that in-plane vibration modes of the head mounting arms supported by the actuator body are not degraded. As a matter of fact, in several tested designs of the present invention, the natural frequency of the pivot mechanism rose due to the lower moving mass of the present invention.

In addition, the smaller moving mass of the pivot mechanism of the present invention produces faster access times, improving the data handling performance of the disc drive assembly.

Finally, since only the inner races of the ball bearings are adhesively bonded in the present invention, and the actuator body is simply press fitted over the outer races of the ball bearings and the tolerance rings, reworking of the pivot mechanism with minimal damage to the relatively expensive actuator body is easily accomplished, thus minimizing scrap costs and keeping down the overall cost of the entire disc drive.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined by the appended claims.

What is claimed is:

1. A pivot mechanism for a rotary actuator in a disc drive data storage device having a base member and a plurality of discs mounted for rotation on the base member for the storage of data, the rotary actuator having a motor for moving a plurality of read/write heads for storing and retrieving data, the pivot mechanism comprising:

a pivot shaft fixedly mounted to the base casting closely adjacent the outer periphery of the plurality of discs and extending in parallel with the axis of the rotation of the discs;

lower and upper ball bearings having inner and outer races and a plurality of balls constrained therebetween, the inner races of the lower and upper ball bearings engaged to the pivot shaft;

an actuator body having a central bore, the actuator body comprising:

first coupling means for coupling the actuator body to the motor; and second coupling means for coupling the actuator body to the plurality of read/write heads;

first and second tolerance rings disposed between the outer races of the lower and upper ball bearings and the inner surface of the central bore of the actuator body; and preload means for biasing the inner races toward each other along the length of the pivot shaft and for biasing the outer races away from each other within the central bore of the actuator body.

2. The pivot mechanism of claim 1 wherein the preload means comprises:
   a shoulder on the pivot shaft against which the inner race of the lower ball bearing abuts; and
   a section of reduced diameter in the central bore in the actuator body against which the outer races of the lower and upper ball bearings abut, the axial spacing of the outer races being established thereby.

3. The pivot mechanism of claim 2 wherein the preload means further comprises:
   a retaining member secured to the top of the pivot shaft; and
   a resilient member disposed between the retaining member and the inner race of the upper ball bearing to bias the inner race of the upper ball bearing toward the inner race of the lower ball bearing.

4. The pivot mechanism of claim 3 wherein the preload means further comprises:
   securing means for securing the inner races to the pivot shaft, the securing means comprising an adhesive to bond the inner race of the upper ball bearing to the pivot shaft.

5. A method of manufacturing a pivot mechanism for a rotary actuator in a disc drive comprising the steps of:
   (1) forming a pivot shaft having a shoulder of larger diameter than the remainder of the pivot shaft closely adjacent a lower end thereof;
   (2) forming an actuator body with a central bore of a first diameter and a narrow section of reduced second diameter at a medial portion of the actuator body;
   (3) mounting upper and lower tolerance rings in the central bore above and below the narrow section, respectively;
   (4) placing a lower ball bearing assembly having an inner and an outer race onto the pivot shaft so that the inner race abuts against the shoulder of the pivot shaft;
   (5) pressing the lower ball bearing assembly supported on the pivot shaft into the central bore below the narrow section until the outer race of the lower ball bearing assembly abuts against the lower surface of the narrow section, thereby compressing the lower tolerance ring between the outer race of the lower ball bearing assembly and the inner surface of the actuator body;
   (6) placing the upper ball bearing assembly having an inner and outer race onto the pivot shaft and into the central bore until the outer race of the upper ball bearing assembly abuts against the upper surface of the narrow section, thereby compressing the upper tolerance ring between the outer race of the upper ball bearing assembly and the inner surface of the actuator body;
   (7) biasing the inner races of the upper ball bearing assembly toward the lower ball bearing assembly.

6. The method of claim 5 further comprising the step of:
   (8) placing an adhesive on the inner race of the upper ball bearing assembly prior to step (6) so that the inner race of the upper ball bearing becomes bonded to the pivot shaft subsequent to step (7) being completed.

7. The method of claim 6 wherein step (7) comprises the steps of:
   applying a preload force to the upper surface of the inner race of the upper ball bearing assembly; and
   maintaining the preload force on the inner race of the upper ball bearing assembly until the adhesive bonding of step (8) is complete.

8. The method of claim 6 wherein step (7) comprises the steps of:
   placing a resilient member on the pivot shaft to press against the inner race of the upper ball bearing assembly; and
   securing a retainer member near the top of the pivot shaft so that the resilient member is compressed between the retainer member and the inner race of the upper ball bearing assembly to thereby apply a preload force to the upper and lower ball bearing assemblies.

* * * * *

UNITED STATES PATENT AND TRADEMARK OFFICE
CERTIFICATE OF CORRECTION

PATENT NO. :   5,315,465
DATED      :   May 24, 1994
INVENTOR(S) :  John B. Blanks It is certified that error appears in the above-indentified patent and that said Letters Patent is hereby corrected as shown below:

Column 4, line 22, after "tracks 20." begin a new paragraph.

Column 5, line 37, delete "int" and substitute therefor --into--;

Column 6, line 34, delete "bali" and substitute therefor --ball--;

Column 6, line 57, delete "subassembly" and substitute therefor --sub-assembly--; and Signed and Sealed this First Day of November, 1994

Attest:

BRUCE LEHMAN

Attesting Officer

Commissioner of Patents and Trademarks